United States Patent [19]

Stoll et al.

[11] Patent Number: 4,477,404
[45] Date of Patent: Oct. 16, 1984

[54] PROCESS FOR PRODUCING GROOVED CHOKE PLATES FOR ADJUSTABLE CHOKES

[76] Inventors: Kurt Stoll, Lenzhalde 72, D-7300 Esslingen, Fed. Rep. of Germany; Hans-Heinrich Glättli, Seestr. 252, CH-8700 Küsnacht ZH, Switzerland

[21] Appl. No.: 376,978

[22] Filed: May 10, 1982

[30] Foreign Application Priority Data

May 14, 1981 [DE] Fed. Rep. of Germany ........ 3119090

[51] Int. Cl.³ ................................................ B29C 1/02
[52] U.S. Cl. ..................... 264/220; 251/208; 264/328.16
[58] Field of Search ........... 264/225, 226, 227, 328.16, 264/219, 220; 251/208

[56] References Cited

U.S. PATENT DOCUMENTS

| Re. 28,826 | 5/1976 | Ladney, Jr. ................. 264/226 X |
| 1,986,637 | 1/1935 | L'Hollier ........................... 264/227 |
| 2,106,623 | 1/1938 | Proctor et al. ................. 264/226 X |
| 2,543,184 | 2/1951 | Marvosh .......................... 264/227 X |
| 2,834,052 | 5/1958 | Hunn ................................ 264/227 X |
| 2,911,008 | 11/1959 | DuBois ............................ 251/208 X |
| 2,968,474 | 1/1961 | Eichelman et al. ............. 251/208 X |
| 3,599,131 | 8/1971 | Flanagan et al. ................ 251/208 X |
| 3,723,584 | 3/1973 | Nussbaum ...................... 264/219 X |
| 4,161,307 | 7/1979 | Clinch et al. ................... 251/208 X |
| 4,371,492 | 2/1983 | Murata ............................... 264/226 |
| 4,380,250 | 4/1983 | Stoll ................................. 251/208 X |

Primary Examiner—Jay H. Woo
Assistant Examiner—James C. Housel
Attorney, Agent, or Firm—Flynn, Thiel, Boutell & Tanis

[57] ABSTRACT

The process is used for producing grooved plates for adjustable chokes, such plates having a choke groove in one side whose change in cross-section along the length of the groove has to be very true, that is to say, keep to very tight size limits. For producing such grooved choke plates of synthetic resin to accurate size in a mold, the first step is cutting an undersize groove in a plate workpiece to make a positive pattern. The plate workpiece is then placed in a choke housing and the flow properties of the choke are measured. Thereafter, further machining of the plate workpiece is undertaken on the basis of the difference between the desired and the actual choke properties of the plate, and at the same time taking into account shrinkage of the synthetic resin on cooling down and becoming solid in an injection mold which is to be later produced as a negative pattern from the positive pattern. To take into account shrinkage of the synthetic resin material in the injection mold for more complex choke groove forms, the positive pattern is heated after measuring it and before producing the negative pattern sufficiently so that a change in the geometry or form of the choke groove is produced which is truly equal and opposite to the shrinkage of the synthetic resin material.

3 Claims, 4 Drawing Figures

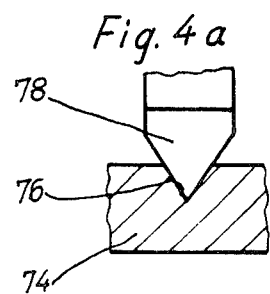
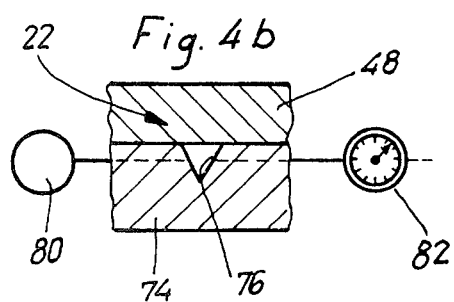
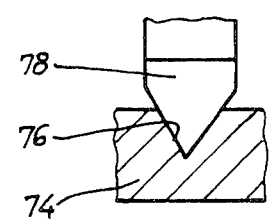
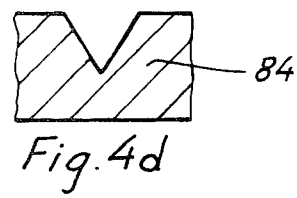
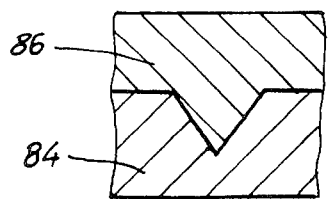
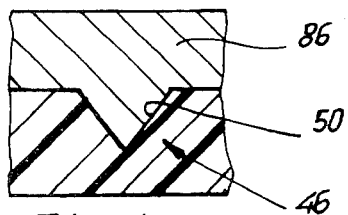
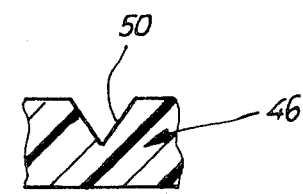

PROCESS FOR PRODUCING GROOVED CHOKE PLATES FOR ADJUSTABLE CHOKES

FIELD OF THE INVENTION

The present invention relates to processes for producing grooved choke plates for adjustable chokes.

BACKGROUND OF THE INVENTION

Such grooved choke plates are used, for example, as the time adjustment element in an adjustable choke which is for example part of a pneumatic RC-timer (see in this respect German offenlegungsschrift specification 2,204,667 for example). The upper and lower limits for the adjustment of the time range of such a timer may, in commonly used systems, be different by a factor of 100, such chokes having to be so designed so that precise adjustment of times within the full adjustment range may be produced and kept to.

Because the resistance to flow of the choke duct, in the form of an open choke groove shut off by a cover plate thereon, is dependent on the fourth power of the depth of the choke groove, very tight conditions have to be kept to with respect to the accuracy of making such systems, and in fact such conditions may generally in the prior art only be kept to by high-price, separate machining of the plates.

If, for reasons of price, there is to be no such highly accurate machining, choke adjustment, to be precise, and to get to a given time of such a timer using a grooved choke plate, is only possible on later use of the choke by using a stopwatch, because it is not possible to undertake such adjustment simply on the basis of the adjustment scale on the choke. For this reason, any lower price possible on mass producing the grooved choke plate will be outbalanced by the loss of time on adjustment of the choke on later operation, which is likely to be of special weight if frequent changes are to be made in the adjustment of the choke, as will probably be the case on changing pneumatic program control systems using pneumatic timers.

SUMMARY OF THE INVENTION

One purpose of the invention is, for this reason, that of providing a process which makes it possible for choke plates with grooves to be produced at a low price while nevertheless accurately keeping to the desired plate geometry.

For effecting this purpose, and further purposes, in the invention the steps are: producing a pattern workpiece from a material with good machining properties, the groove produced therein being undersize, measuring the cross-section of the groove of the pattern workpiece with respect to its resistance to flow in a condition in which said pattern workpiece is placed in a choke housing, further machining said pattern workpiece so that the groove is machined until it has the desired cross-section geometry of the desired choke groove, such machining being undertaken with reference to the difference between the desired and measured properties of the groove, producing from such positive pattern a negative pattern, and using such negative pattern for injection molding grooved choke plates of thermoplastic material.

In the process of the invention the high-price mechanical, highly accurate machining and the complex or high-price measuring of the choke groove only have to be undertaken with great care once over, because the choke groove, when once produced with the best desired properties, may be produced by injection molding with the use of a negative pattern so that the same high quality reproduction of the geometry of the choke groove may be undertaken at a very low price.

Further useful developments of the invention are to be seen in the dependent claims.

As part of one such further development, the choke groove in said positive pattern is further machined to take into account shrinkage of such thermoplastic material on cooling down in an injection mold. With this further development of the invention, it becomes possible for such synthetic resins to be used for injection molding the choke plates with grooves as have a very high shrinkage, as for example synthetic resin materials compounded with a low filler level.

As a still further development of the invention, it is possible for the measuring of the flow resistance of the positive pattern to be undertaken at a temperature which, taking into account the coefficient of thermal expansion of the material of the positive pattern and the thermoplastic material, is so far under that temperature at which the negative pattern is produced that within this temperature range there is the same shrinkage of the positive pattern as the shrinkage of the injected material on dropping in temperature in the injection mold. With this further development of the invention, it is possible for the shrinkage to be fully balanced even in the case of a complex geometry of the choke groove, this being because the positive pattern undergoes the same temperature-dependent changes in geometry as the injection material, but in the opposite direction.

It is furthermore possible for the negative pattern to be produced at room temperature and for the positive pattern to be measured at low temperatures. In this further development of the invention, it is possible for a synthetic resin to be used for making the positive pattern, such synthetic resin materials, more specially ABS, having a very high coefficient of thermal expansion and such properties that they may well be used for producing negative patterns by electroplating. Using such synthetic resin materials, generally large changes in the geometry may be produced by thermal effects for fully copying the shrinkage of the injected material.

As a still further part of the present invention, the positive pattern is measured at room temperature and the negative pattern is made at high temperatures, using a material resistant to such high temperatures and having a low coefficient of thermal expansion. The useful part of this further development of the invention is that the machining of the positive pattern may be undertaken at room temperature and furthermore the positive pattern may be made of a material whose coefficient of thermal expansion is not very large so that the positive pattern, used for producing the negative pattern, may be heated to a greater degree. In this case, as a further useful effect, the negative pattern may be produced using a finely powdered metallurgical material which may be sintered directly in the positive pattern at the temperatures used for producing the negative pattern.

As part of a still further teaching of the present invention, for producing grooved choke plates with a groove becoming deeper linearly in the circumferential direction of the groove, a machining tool with a cutting outline representative of the outline of the cross-section of the groove is turned about an axis which is at a slope to a line normal to the plate workpiece by an amount equal to the helix angle of the choke groove in the completed product and, if desired, is furthermore arranged at a small shrinkage angle representative of the shrinkage of material on injection molding. Using this form of the process of the invention, choke grooves with a small slope may be particularly simply and exactly produced and, furthermore, by further tilting of the axis about which the machining tool is turned, it is readily possible for the material shrinkage on injection molding to be roughly taken into account.

BRIEF DESCRIPTION OF THE DRAWINGS

An account will now be given of the invention using the figures in more detail.

FIG. 4a is a fragmentary sectional side view of a pattern workpiece and shows a machining tool creating a groove therein.

FIG. 4b is a fragmentary diagrammatic sectional side view of the pattern workpiece of FIG. 4a in a test device.

FIG. 4c is a fragmentary sectional side view similar to FIG. 4a of the pattern workpiece and machining tool.

FIG. 4d is a fragmentary sectional side view of the pattern workpiece of FIG. 4a.

FIG. 4e is a fragmentary sectional side view of the pattern workpiece of FIG. 4a and a negative pattern thereof.

FIG. 4f is a fragmentary sectional side view of the negative pattern of FIG. 4e and a choke plate made of a synthetic resin.

FIG. 4g is a fragmentary sectional side view of the synthetic resin choke plate of FIG. 4f.

DETAILED DESCRIPTION

Figure 1:
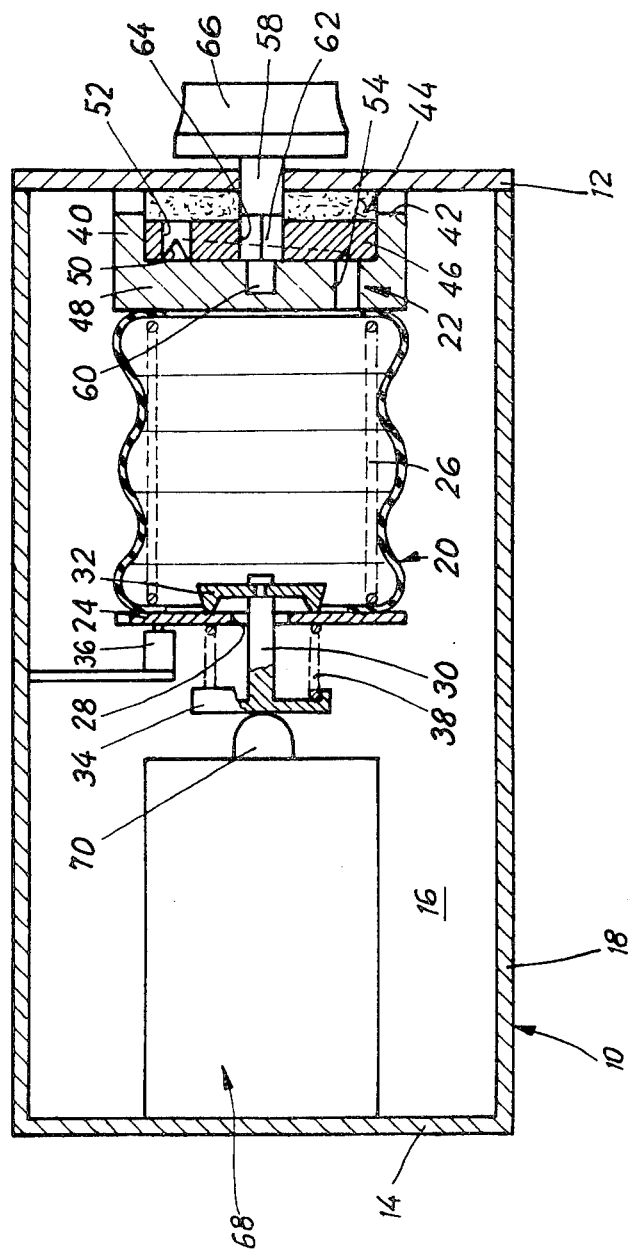
FIG. 1 is a longitudinal sectional side view of a pneumatic timer with an adjustable choke for adjustment of the timing function, which is an example of one possible use of a choke plate as produced according to the present invention.

In FIG. 1 the reader will see a pneumatic timer with a box-like synthetic resin housing shut at one end by a cover 12. The housing 10 has an end wall 14 and upright and horizontal side walls 16 and 18.

A flexible bellows 20, which has one end air-tightly fixed to the free side of the choke housing 22, which is supported on the cover, and at its other end is shut off by an end plate 24, takes the form of the capacitance of a pneumatic RC-component. An inner helical compression spring 26 is responsible for pushing the bellows 20 into the stretched out condition to be seen in the figure.

End plate 24 has a middle valve opening 28 with a valve stem 30 running therethrough, such stem having on its free end, to be seen on the right in FIG. 1, a somewhat elastically giving valve plate 32 placed inside the bellows 20. The other end of the valve stem 30 has a spring backup or limiting plate 34 thereon, acted upon by one end of a helical compression spring 38 whose other end is rested against the outer side of end plate 34 and which is less stiff than helical compression spring 26.

There is furthermore a pneumatic limit feeler 36 for functioning with end plate 24 which is supported on the housing 10. Such feeler is used for controlling a pneumatic load as for example the next control stage in a pneumatic program control system.

If the spring backup plate 34 is moved against the force of helical compression spring 38 to the right in FIG. 1, the valve backup plate 32 is lifted clear of the end plate 24 and the air within the bellows is then let off freely through valve opening 28 into the part inside the housing 10 outside the bellows, the bellows 20 being forced together.

When the plate 34 is freed again after the bellows 20 has been forced together, valve opening 28 will be shut off again by valve plate 32 and bellows 20 will undergo expansion, it taking in air slowly from the inside of the housing 10 and so going back into its starting position. In this respect, the air makes its way through inlet openings or cutouts 42 in the outer wall 40 of the cup-like choke housing 22, such openings being like crenulations in the edge of the wall and being spaced out evenly in the round-the-housing direction, such air then going through a filter plate 44 of open-pored elastic filter material. The side of the filter plate 44, which is on the right in FIG. 1, is rested against cover 12 and its side which is on the left in FIG. 1 has the effect of forcing a grooved choke plate 46 or disk elastically and fully against the floor 48 of the choke housing 22 so as to make an air-tight connection therewith.

In the side to be seen on the left in FIG. 1 of the grooved choke plate 46 there is a choke groove 50, whose middle line is concentric with the axis of the grooved choke plate 46, the three-cornered cross-section of the groove changing smoothly in the round-the-plate of circumferential direction.

That end of choke groove 50 which has the greatest cross-section area is joined up by way of an axial hole 52 with the side to be seen on the right in FIG. 1 of the grooved choke plate 46 and, for this reason, is joined up, by way of the filter 44 and the inlet openings 42, with the space inside the housing 10.

A let-off duct 54 is so placed that it is radially aligned with respect to the middle line of the choke groove 50, such duct being in the floor 48 of the choke housing 22 and being placed radially within the bellows 20 and opening at the side, to be seen on the left in FIG. 1, of the choke housing 22.

An adjustment shaft 58 has its outer end rotatably supported in an opening in cover 12 and has a left hand end part 60, of decreased diameter, such part 60 being rotatably supported in an opening in the floor 48 of the choke housing 22. A part 62 with four flats of the adjustment shaft 58 is locked in a hollow 64 of the same form in the choke plate 46 with the groove. A handle 66 is fixed on the outer end of adjustment shaft 58.

On the end wall 14 of housing 10 there is a pneumatic cylinder 68, which is only presented diagrammatically and whose piston rod 70 has its rounded end resting against spring backup plate 34.

Figure 2:
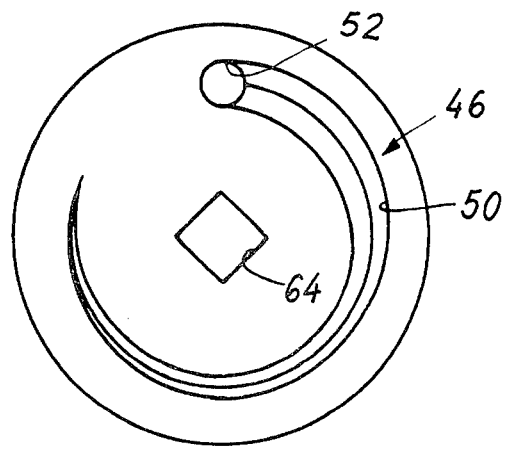
FIG. 2 is an elevational end view of a choke plate used in the timer of FIG. 1 and having a groove therein.

FIG. 2 is a view of the grooved choke plate or disk 46.

For producing a single plate 46, the choke groove 50 is cut using a coned milling tool, with a form answering to the desired groove cross-section, such tool being progressively moved into the workpiece in the axial direction, while at the same time the grooved choke plate 46 is turned.

Figure 3:
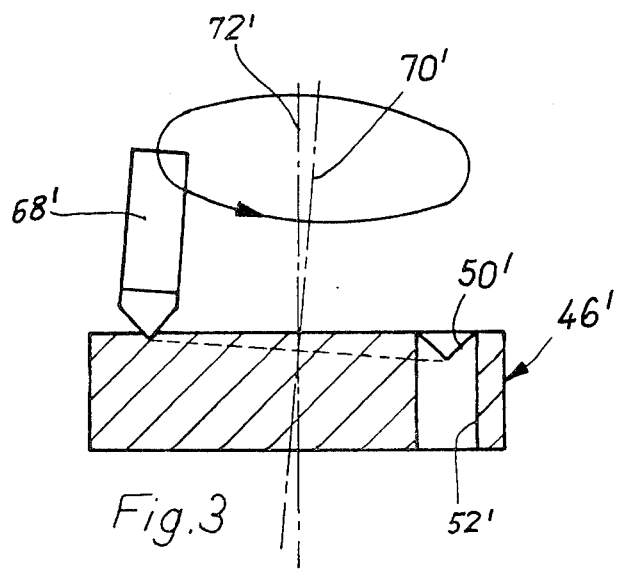
FIG. 3 is a sectional side view of a positive pattern workpiece for a special-purpose choke plate and shows a machining tool for producing a groove having a simple groove geometry.

FIG. 3 is a view of a simple way of producing a somewhat changed form of grooved choke plate 46', in which the cross-section of the choke groove 50' is only decreased over an angle of 180°, the groove then becoming greater in cross-section symmetrically with respect to the first part of the groove. Such a grooved choke plate can be simply produced by turning a cutting tool 68', whose cutting tip is representative of the desired groove cross-section, about an axis 70', such axis being at a slope with respect to the axis 72' of the grooved choke plate 46' by an amount corresponding to the pitch angle of the choke groove 50'. If on producing the choke groove 50' on these lines, a structure shutting off one end of hole 52' is later produced, it is then possible to have an adjustment range of more of 180° in the case than such a grooved choke plate, and in fact the range of adjustment may go up to nearly 260°, this system then giving generally fine adjustment of the choke properties where there is the greatest resistance to flow, because the cross-section of the choke groove becomes greater again.

An account will now be given, using FIG. 4, of a process for producing grooved choke plates of synthetic resin on a large scale with a high degree of precision, the different steps in the process being seen diagrammatically in the separate views (a) to (g) of FIG. 4.

In view (a) a groove 76 is produced in rough plate workpiece 74 using a machining tool 78. The groove 76 is undersize in relation to the desired cross-section of the choke groove 50 to be produced in the completed choke plate.

The plate workpiece 74 having the groove 76 is placed in a choke housing 22 and the properties or characteristic of the choke so produced are measured in the form of the flow resistance at different angles of the plate workpiece using compressed air from a flow rate measuring instrument 82 joined up with a compressed air source 80, see diagrammatic FIG. 4(b).

In the next stage, see FIG. 4(c), groove 76 is machined to the desired size using tool 78 (or possibly some precision machining tool with the same geometry, as for example a grinding or lapping tool), such machining being carried out till the true size of the groove is as far as possible equal to the desired size thereof.

To do this, it is necessary for process steps (b) and (c) to be undertaken again and again till the desired size or properties of the groove are produced. The plate workpiece will now be a positive pattern 84 for a grooved choke plate 50.

The temperature of the positive pattern 84 is now increased to be greater than the measurement temperature $T_m$ at which the positive pattern is produced in a further process step (d), the temperature of said pattern 84 being increased to a temperature $T_f$ for producing said negative pattern so that there is such a thermal expansion of the positive pattern as is equal in amount to the shrinkage, of opposite effect, taking place when the synthetic resin, used for producing grooved choke plates, is cooled down and becomes solid in the injection mold.

At the temperature $T_f$ in process step (e), a negative pattern 86 is then produced which may be used as an injection mold part.

In the process step (f), grooved choke plates or disks 46 are produced from synthetic resin using the negative pattern 86, and such plates 46, when cooled down, have the true form in all respects of the positive pattern at temperature $T_m$ and for this reason have the true desired choke properties.

The material used for the positive pattern 84 may be one which while being readily machined has the largest possible coefficient of thermal expansion so that the difference between temperatures $T_m$ and $T_f$ is not overgreat. More importantly, it may be made of synthetic resins such as PTFE or ABS (acrylonitrile-butadienestyrene). The last-named resin is specially useful for this purpose because of its making possible the production of a negative pattern by electro-plating.

Because in the case of electro-plating there is little choice with respect to temperatures $T_f$ and furthermore such synthetic resins may be damaged by being strongly heated by an amount of the order of 100° above the hot temperature, that is to say there is a loss of the strength of such resins, in making a selection of a synthetic resin for the positive pattern 84 the measurement temperature $T_m$ will be such that it is under room temperature by a representative amount, that is to say at least process step (b) will be undertaken on a plate workpiece 74 which is cooled to a very much lower temperature. To this end, the complete choke may be simply placed in a $CO_2$-alcohol mixture or be strongly cooled by using liquid air—possibly in a vessel with a cryostat. If care is taken to see that the inside of the choke is free of moisture (by flushing with dry nitrogen in an earlier step), the grooved choke plate will be able to be freely turned even when the choke has been cooled down.

As a material for the positive pattern, it is, however, furthermore possible to make use of a metal with a high coefficient of thermal expansion, the metal plate workpiece then being worked or machined at room temperature and the completed positive pattern then being heated to a temperature far above room temperature for producing the negative pattern. As a material for the negative pattern a heat-resistant material with a low coefficient of thermal expansion may be used, as for example finely milled $Al_2O_3$, which is then sintered for producing the negative pattern at high temperatures under pressure against the positive pattern (the $Al_2O_3$ powder being mixed if desired with a binder or flux).

The negative pattern so produced is then naturally only cooled down after being separated from the positive pattern at first locked thereto.

If necessary, after taking the negative pattern out of the mold and cooling it down, it may further be vapor-coated with metal and then electro-plated with metal so that the outer surface thereof is completely pore-free. Such a sintered negative pattern is then adhesively fixed to a tough base material so that it will not be damaged by high dynamic loads in an injection mold.

Because changes in the axial and radial overall sizes of a grooved choke plate are unimportant, unlike changes in the geometry or form of the grooved choke plate, all that is needed in the present process as noted is for the negative pattern to be produced for use as the end wall of the injection mold.

In the case of specially simple choke groove cross-section forms, the decrease in cross-section of the choke groove in the injection molded product on cooling down in the injection mold may be worked out beforehand with a degree of accuracy which is high enough for many uses and, after undertaking the process steps (b) and (c) and in place of the heating in process step (d) as noted, further machining steps may be undertaken which take into account the shrinkage correction as worked out.

Although it will be clear to the reader in any case, it is to be noted that the changes in form or geometry in FIG. 4 caused by thermal effects are to be seen on a greatly increased scale.

The new process is specially useful for producing the choke groove of a pneumatic potentiometer or pneumatic rotary resistor as used in pneumatic timers and in fact, in many cases, it is not necessary, or not desired, for the flow resistance to be linearly dependent on the angle of turning. In this respect it has turned out to be useful, within the framework of the present invention, for the design to be such that the scale values adjusted to in a given case are caused to be equal to the logarithm of the flow rate/unit time as far as a factor and an additive constant so that, in this case, adjustment may be undertaken over the full range of the timer with a constant relative accuracy, in which respect, as part of the invention, a channel in the form of part of a circle would be necessary, whose cross-section is representative of a certain function of the angle of turning. (It is to be noted in this connection that the resistance to flow of a length of pipe is, on the one hand, directly proportional to the length and, on the other hand, inversely proportional to the fourth power of the diameter).

In the process of the invention, a groove or channel is cut out or planed with a cross-section in the form of an equal-sided triangle using a cutting bit with a cutting angle of 60° (the cross-sectional area of the groove being proportional to the square of the depth), the groove being cut in one plane by turning the cutting bit about an axis at a certain distance therefrom, such axis being at a small angle of for example 2° to 3° to a line normal to the plane of the workpiece surface. The groove is now cut along a part of a circle equal to about 180° to 210°. By limiting the operation to this angle of turning, a logarithmic scale or characteristic is produced with a good degree of approximation. However, for economic and true or accurate production, directly measuring the grooves with a measuring instrument is likely to be troublesome (for reasons or accuracy), while indirecting measuring by measuring the resistance to flow will be overhigh in price or not be quick enough, for which reason the steps in the invention may be:

1. Producing an undersize original or master groove (channel) after working out the angle of slope, for example in a brass workpiece, brass as a material having the useful properties of being readily machined, not having an undesired effects on an electro-plating bath, being able to be separated from nickel and being more in line with the needs with respect to the coefficient of thermal expansion.
2. Measuring the resistance to flow against the angle of turning on changing the same.
3. Truing up, for example by lapping and/or changing the angle of slope.
4. Producing a nickel negative by electro-plating.
5. Machining the electro-plated structure to take the form of a mold insert.
6. Injection molding of grooved plates using a synthetic resin which at the likely working pressures will not be damaged and on the other hand is able to be bent a small degree so that it may be forced sealingly against a lapped face by a rubber-like washer.

In connection with the process as noted so far, it is to be noted in addition that, on producing the master groove, the demolding errors produced in later process steps have to be taken into account, it being highly necessary for this purpose for a master groove to be produced which at two points, that is to say at the start and end of the groove, has the right resistance values. Because the properties of the molding are somewhat different to the desired properties, the necessary predistortion with which the master groove is to be produced may be worked out beforehand.

The embodiments of the invention in which an exclusive property or privilege is claimed are defined as follows:

1. A process for manufacturing a choke plate for an adjustable choke mechanism adapted to control the rate of flow of a fluid, said choke plate having a surface with a groove therein and said groove having a cross-sectional area which varies along the length thereof so that various predetermined fluid flow rates occur at respective locations therealong, comprising the steps of: machining a groove in a surface of a pattern workpiece, said groove having various cross-sectional dimensions at respective locations therealong which are smaller than the dimensions required to achieve said predetermined flow rates at such locations; thereafter placing said surface of said pattern workpiece against a surface of a test device having means for causing fluid to flow through selected portions of said groove in said pattern workpiece, and then measuring the fluid flow rates through various portions of said groove; thereafter performing further machining of said groove in said pattern workpiece to increase the cross-sectional dimensions of said groove along the length thereof; repeating said steps of placing said pattern workpiece in a test device, measuring fluid flow rates at various locations in said groove thereof, and further machining said groove until said measured fluid flow rates through said groove are in conformity with said predetermined fluid flow rates; thereafter preparing a negative pattern of said pattern workpiece by electroplating; and thereafter placing said negative pattern in an injection molding apparatus so that said negative pattern defines a portion of a mold cavity thereof, injecting a quantity of a thermoplastic material into said mold cavity, cooling said quantity of said thermoplastic material in said mold cavity to form said choke plate, and removing said thermoplastic material from said mold cavity; wherein said steps of machining said groove in said pattern workpiece are carried out by moving a machining tool having a cutting outline representative of the cross-sectional shape of said groove about an axis which is arranged at a small angle with respect to a line normal to said surface of said pattern workpiece; and including just prior to said step of preparing said negative pattern a final machining step which includes the step of increasing said small angle slightly so as to increase the cross-sectional area of said groove in said pattern workpiece by an amount equivalent to the degree of shrinkage of said thermoplastic material in said mold cavity during said cooling step.

2. A process for manufacturing a choke plate for an adjustable choke mechanisms adapted to control the rate of flow of a fluid, said choke plate having a surface with a groove therein and said groove having a cross-sectional area which varies along the length thereof so that various predetermined fluid flow rates occur at respective locations therealong, comprising the steps of: machining a groove in a surface of a pattern workpiece, said groove having various cross-sectional dimensions at respective locations therealong which are smaller than the dimensions required to achieve said predetermined flow rates at such locations; thereafter placing said surface of said pattern workpiece against a surface of a test device having means for causing fluid to flow through selected portions of said groove in said pattern workpiece, and then measuring the fluid flow rates through various portions of said groove; thereafter performing further machining of said groove in said pattern workpiece to increase the cross-sectional dimensions of said groove along the length thereof; repeating said steps of placing said pattern workpiece in a test device, measuring fluid flow rates at various locations in said groove thereof, and further machining said groove until said measured fluid flow rates through said groove are in conformity with said predetermined fluid flow rates; thereafter preparing a negative patern of said pattern workpiece by placing a quantity of a finely milled heat resistant material with a low coefficient of thermal expansion against said pattern workpiece and sintering said heat resistant material; and thereafter placing said negative pattern in an injection molding apparatus so that said negative pattern defines a portion of a mold cavity thereof, injecting a quantity of a thermoplastic material into said mold cavity, cooling said quantity of said thermoplastic material in said mold cavity to form said choke plate, and removing said thermoplastic material from said mold cavity; wherein said steps of machining said groove in said pattern workpiece are carried out by moving a machining tool having a cutting outline representative of the cross-sectional shape of said groove about an axis which is arranged at a small angle with respect to a line normal to said surface of said pattern workpiece; and including just prior to said step of preparing said negative pattern a final machining step which includes the step of increasing said small angle slightly so as to increase the cross-sectional area of said groove in said pattern workpiece by an amount equivalent to the degree of shrinkage of said thermoplastic material in said mold cavity during said cooling step.

3. The process as claimed in claim 1 or claim 2, wherein said groove in said choke plate is arcuate and has a cross-sectional area which decreases linearly in a circumferential direction of said groove.

* * * * *